US005746808A

United States Patent [19]
Hellenschmidt

[11] Patent Number: 5,746,808
[45] Date of Patent: May 5, 1998

[54] THERMAL PROCESSING AND PACKAGING SYSTEM EMPLOYING AN INTERMEDIATE DEGASSING TANK

[75] Inventor: Stephen P. Hellenschmidt, Baltimore, Md.

[73] Assignee: Tetra Laval Holdings & Finance SA., Pully, Switzerland

[21] Appl. No.: 642,020

[22] Filed: Apr. 29, 1996

[51] Int. Cl.⁶ .................................................. B01D 19/00
[52] U.S. Cl. .................. 96/205; 95/252; 96/206; 96/220; 426/487
[58] Field of Search .................. 95/241, 251, 252; 96/155, 170, 205, 206, 218, 220; 426/399, 487

[56] References Cited

U.S. PATENT DOCUMENTS

| | | |
|---|---|---|
| 580,169 | 4/1897 | Washington . |
| 1,095,463 | 5/1914 | Kieser .................. 96/206 |
| 1,727,733 | 9/1929 | Stovall . |
| 2,428,044 | 9/1947 | Sharp et al. .................. 426/487 |
| 2,713,973 | 7/1955 | Hencken et al. . |
| 2,738,852 | 3/1956 | Freneau et al. .................. 96/206 |
| 2,772,979 | 12/1956 | Graves .................. 426/487 |
| 3,200,568 | 8/1965 | McNeil . |
| 3,368,330 | 2/1968 | Elliott . |
| 4,023,941 | 5/1977 | Miller . |
| 4,087,261 | 5/1978 | Hays . |
| 4,210,176 | 7/1980 | Emming .................. 96/206 |
| 4,343,630 | 8/1982 | Grant .................. 96/206 |
| 4,486,203 | 12/1984 | Rooker . |
| 4,755,194 | 7/1988 | Rooker et al. . |
| 5,308,384 | 5/1994 | Kapanen et al. . |
| 5,403,475 | 4/1995 | Allen . |
| 5,405,435 | 4/1995 | Bekedam . |

FOREIGN PATENT DOCUMENTS

| | | | |
|---|---|---|---|
| 576838 | 5/1933 | Germany .................. 96/206 |
| 59-97508 | 8/1981 | Japan .................. 96/155 |
| 59-39308 | 3/1984 | Japan .................. 96/206 |
| 61-157321 | 7/1986 | Japan .................. 96/155 |
| 1608409 | 11/1990 | U.S.S.R. .................. 96/205 |

*Primary Examiner*—C. Scott Bushey
*Attorney, Agent, or Firm*—Michael A. Catania

[57] ABSTRACT

A thermal processing system for processing a hot-fill liquid product and filling containers with the hot-fill liquid product is set forth that includes: 1) a thermal processing unit for thermally processing the hot-fill liquid product; 2) a packaging machine for filling individual containers with the hot-fill liquid product; and 3) an intermediate degassing tank. The intermediate degassing tank includes a tank body having an inlet receiving the thermally processed hot-fill liquid product from the thermal processing unit, an interior chamber holding the thermally processed hot-fill liquid, and an outlet facilitating fluid communication of the thermally processed hot-fill liquid product from the interior chamber of the degassing tank to the packaging machine, and a vent. A degasser is disposed in the interior chamber of the tank body and receives the hot-fill liquid product from the inlet. The degasser includes an inlet and an outlet and is shaped to have a greater flow area at the outlet than at the inlet to facilitate degassing of the hot-fill liquid product. The outlet of the degasser opens to the interior chamber of the tank body. Excess gases that are removed from the liquid product pass to the vent for venting, for example, to the ambient atmosphere. A baffle is disposed in the interior chamber of the tank body to at least partially separate the outlet of the degasser from the inlet through the tank body. The baffle assists in preventing short-circuiting of the gases to the tank outlet.

29 Claims, 5 Drawing Sheets

THERMAL PROCESSING AND PACKAGING SYSTEM EMPLOYING AN INTERMEDIATE DEGASSING TANK

TECHNICAL FIELD

The present invention relates to thermal processing and packaging of a hot-fill liquid. More specifically, the present invention relates to a thermal processing and packaging system employing an intermediate degassing tank to degas a thermally, processed, hot-fill liquid prior to filling by a packaging machine.

BACKGROUND

Recently, there has been an increased demand for hot-fill beverages. Such beverages are typically heated to a temperature sufficient to sterilize the beverage as well as the container into which the beverage is placed. As such, these beverages generally do not contain preservatives.

A traditional system used for thermally processing the beverage and placing the beverage into individual containers for subsequent consumption is illustrated in FIG. 1. As shown, the processing system, shown generally at 10, includes a thermal processing unit 15, an intermediate storage tank 20, and a packaging machine 25. The thermal processing unit 15 accepts the unprocessed beverage and heats it to a temperature sufficient to sanitize both the beverage and the container into which it is ultimately placed. The thermally processed beverage is then conveyed to the input of the intermediate storage tank 20 through, for example, one or more pipes 30. The intermediate storage tank 20 acts as a buffer between the thermal processing unit 15 and the packaging machine 25. Such a buffer is typically required to compensate for the difference between the generally constant output flow rate of the thermal processing unit 15 and the generally variable beverage input requirements of the packaging machine 25. The thermally processed, hot-fill beverage is communicated to the packaging machine 25 through one or more pipes 35. Within the packaging machine 25, the hot fill beverage is placed into containers, such as glass bottles or jars, cans, PET or other polymer containers, etc.

As the consumer demand for hot-fill beverages increases, there are increased demands placed on the thermal processing and filling systems. More specifically, there now exists a need to increase the filling rate of the system to meet the increased rate of consumption of hot-fill beverages by the consumer.

SUMMARY OF THE INVENTION

A thermal processing and filling system is set forth that enables a system equipped with, for example, a conventional thermal processing unit and conventional packaging machine, to have an increased throughput to meet the added demands that have been placed on these systems by the packager. To this end, the present inventor has recognized that the fill rate of the packaging machine of such a system is often limited by the existence of gases released from the hot-fill liquid as a result of the thermal processing. Excess free gases that remain in the product, particularly pulpy products, such as orange juice, cause "low-fills" due to the foaming that occurs as the product is dispensed into the containers. As a result, the conventional systems must often be operated at a significantly slower fill rate when compared to their maximum fill rate.

To counter this problem, a thermal processing system for processing a hot-fill liquid product and filling containers with the hot-fill liquid product is set forth that comprises: 1) a thermal processing unit for thermally processing the hot-fill liquid product; 2) a packaging machine for filling individual containers with the hot-fill liquid product; and 3) an intermediate degassing tank. The intermediate degassing tank comprises a tank body having an inlet receiving the thermally processed hot-fill liquid product from the thermal processing unit, an interior chamber holding the thermally processed hot-fill liquid, and an outlet facilitating fluid communication of the thermally processed hot-fill liquid product from the interior chamber of the degassing tank to the packaging machine, and a vent. A degasser is disposed in the interior chamber of the tank body and receives the hot-fill liquid product from the inlet. The degasser comprises an inlet and an outlet and is shaped to have a greater flow area at the outlet than at the inlet to facilitate degassing of the hot-fill liquid product. The outlet of the degasser opens to the interior chamber of the tank body. Excess gases that are removed from the liquid product pass to the vent for venting, for example, to the ambient atmosphere. A baffle is disposed in the interior chamber of the tank body to at least partially separate the outlet of the degasser from the inlet through the tank body. The baffle assists in preventing short-circuiting of the gases to the tank outlet.

In accordance with a further aspect of the present invention, a particular construction of the degasser is provided. More particularly, the degasser may include an elbow section having a first open end connected to receive the liquid product from the inlet through the tank body, and a second open end disposed approximately at a right angle with respect to the first open end. The degasser further comprises a first frustoconical channel section having a first open end connected to the second open end of the elbow section and a second open end that is in fluid communication with the interior chamber of the tank body The second open end of the frustoconical channel section has a flow cross-section that is larger than the flow cross-section of the first open end of the frustoconical channel section.

The degasser may also be provided with a second frustoconical channel section. Such a second frustoconical channel section comprises a first open end connected to receive the liquid product from the second open end of the first frustoconical channel section and a second open end in fluid communication with the interior chamber of the tank body. The second open end of the second frustoconical channel section has a flow cross-section that is larger than the flow cross-section of the first open end of the second frustoconical channel section while the flow cross-section of the second end of the first frustoconical channel section is larger than the flow cross-section of the first open end of the second frustoconical section. The first opening of the second frustoconical channel section is disposed to receive a portion of the liquid product from the opening of the second open end of the first frustoconical section and may be interconnected by a plurality of radial tabs extending the frustoconical sections.

The foregoing intermediate degassing tank and degasser may be provided with selected features that make them particularly adapted to the generally sterile environment required of thermal processing systems. For example, the intermediate storage tank may be provided with a re-sealable manhole that allows a person to enter the tank to clean and sterilize the interior chamber and the components therein. Additionally, a pair of nozzles may be provided that are disposed on opposite sides of the baffle. Further, the frustoconical channel section(s) may be separable from the elbow section to facilitate a C-O-P operation.

The foregoing system provides a benefit to producers in that their production costs may be decreased by increasing the line capacities while retaining the fixed operational costs at a constant level. Other objects and advantages of the present invention will become apparent upon reference to the accompanying detailed description when taken in conjunction with the following drawings.

DETAILED DESCRIPTION OF THE PREFERRED EMBODIMENT

Figure 1:
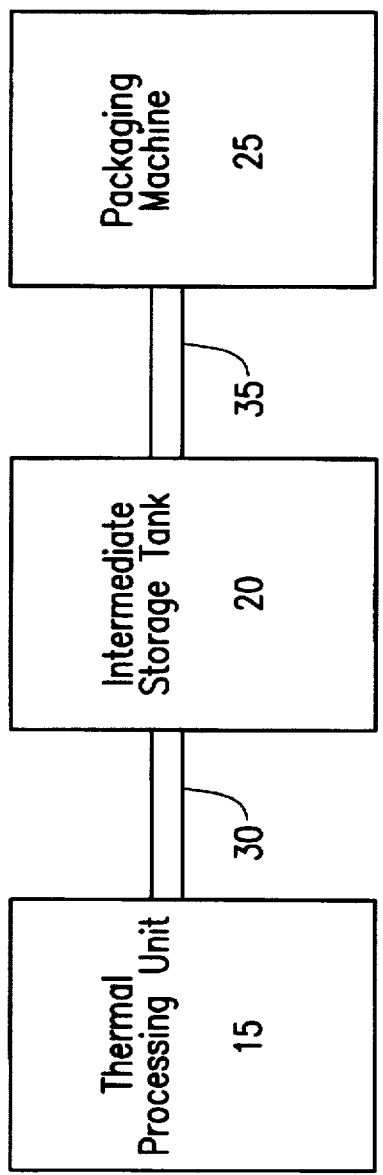
FIG. 1 is a schematic illustration of a conventional thermal processing and filling system.
Figure 2:
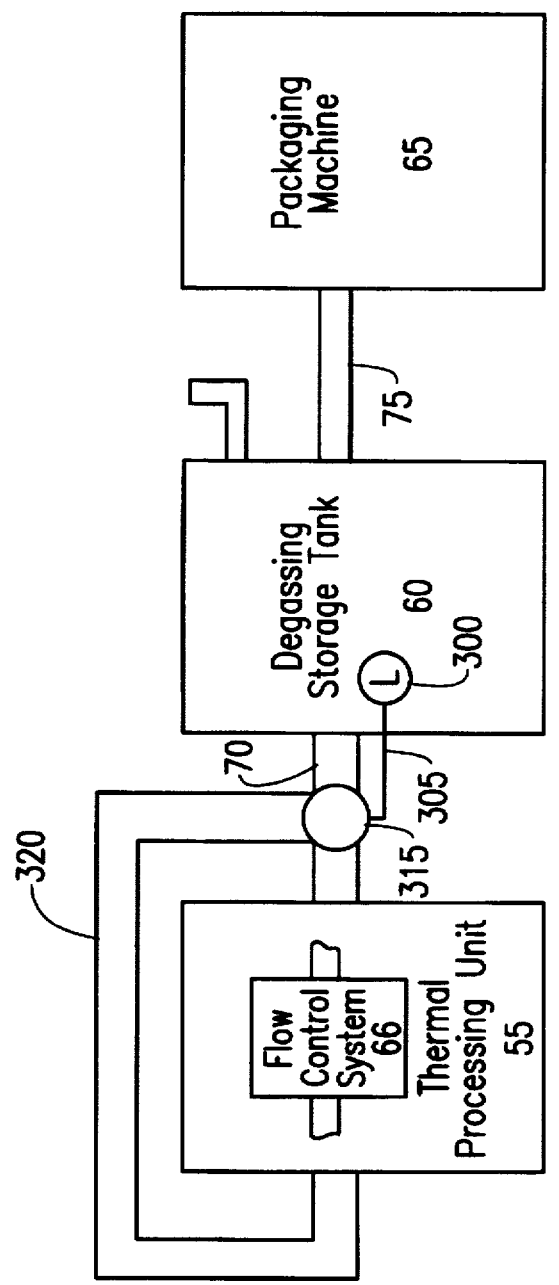
FIG. 2 is a schematic illustration of a thermal processing and filling system constructed in accordance with one embodiment of the present invention.

A thermal processing and filling system is set forth generally at 50 of FIG. 2. The system 50 includes a thermal processing unit 55, an intermediate degassing storage tank 60, and a packaging machine 65. The thermal processing unit 55 may be constructed in accordance with conventional thermal processing unit design and may be a unit such as one available from Tetra Pak, Inc., of Chicago, Ill. The thermal processing unit accepts the unprocessed liquid and heats it to a temperature sufficient to sanitize both the beverage and the container into which it is ultimately placed.

Figure 2A:
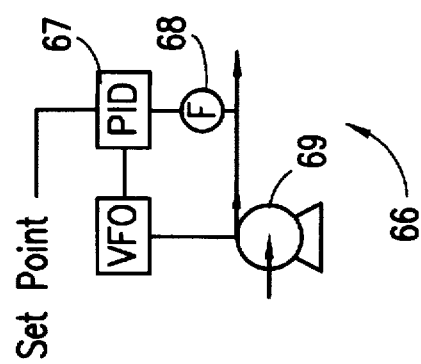
FIG. 2A is a schematic block diagram of one embodiment of a flow control system that may be used in the thermal processing unit of the system of FIG. 2.
Figure 3:
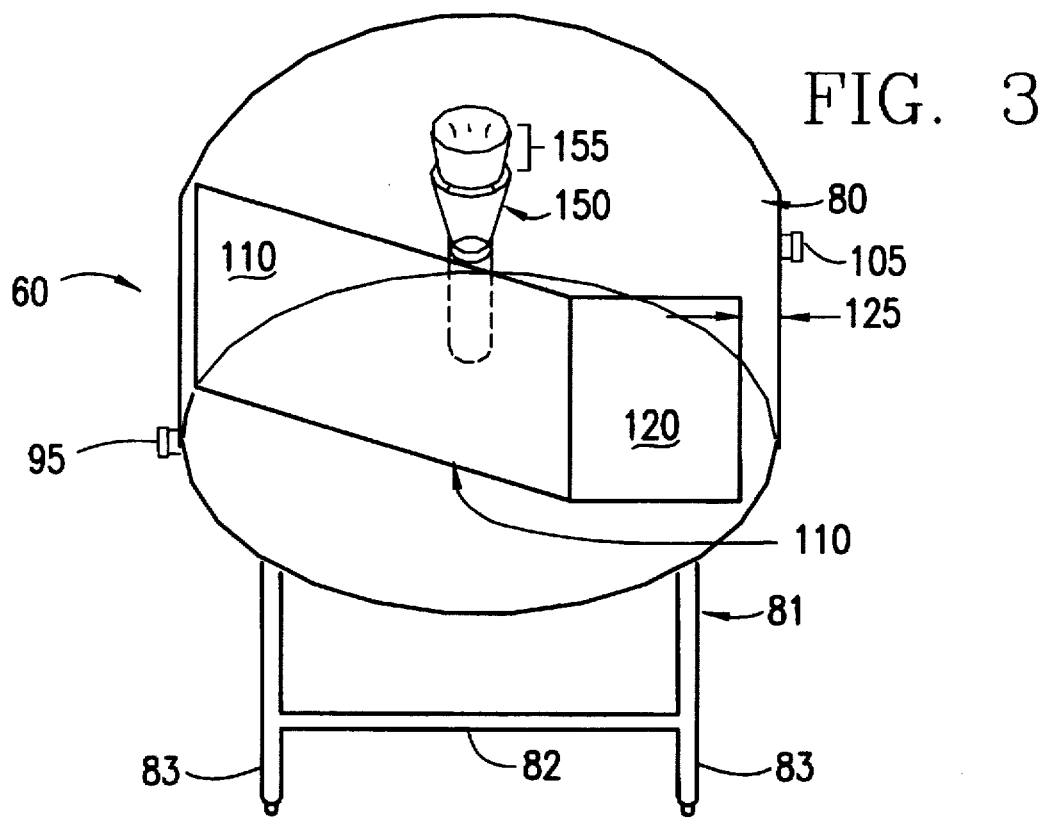
FIG. 3 is a partial cross-sectional isometric view of one embodiment of the intermediate degassing storage tank of FIG. 2.
Figure 4:
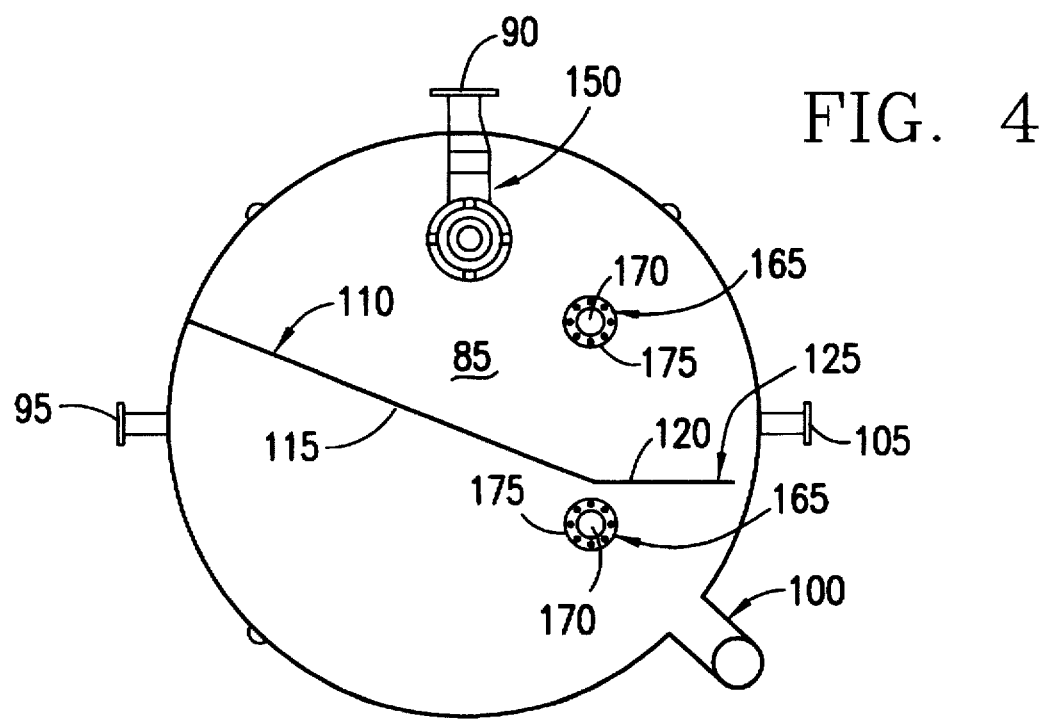
FIG. 4 is a cross-sectional view of the top of the intermediate degassing storage tank of FIG. 2.
Figure 5:
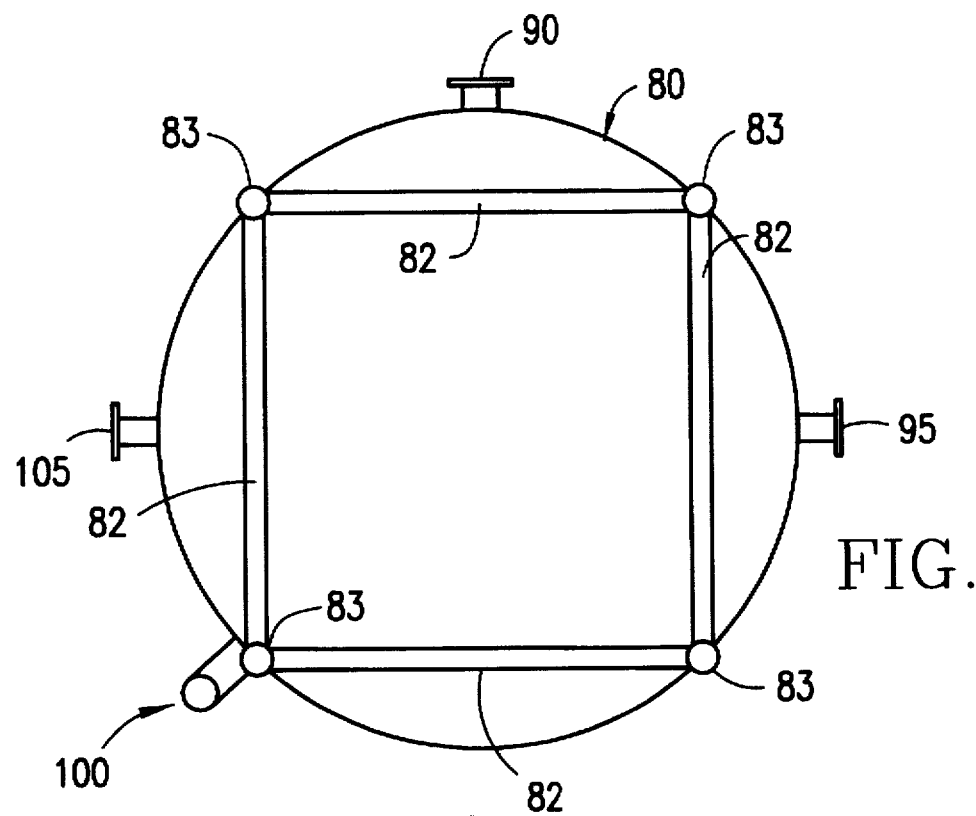
FIG. 5 is a bottom view of the intermediate degassing storage tank of FIG. 2.

Generally, the thermal processing unit provides the processed liquid at a constant flow rate. The flow may be controlled, for example, using the flow control system 66 shown in FIGS. 2 and 2A. The flow control system 66 utilizes a proportional-integral-derivative (P-I-D) controller 67 that uses the flow detected with a flowmeter 68 and compares the measured flow to a set point value. The P-I-D controller 67 varies the speed of a centrifugal timing pump 69 using an AC frequency controller, illustrated here as VCO 69 that receives a digital representation of the output value of the P-I-D calculation.

The thermally processed liquid is then conveyed to the input of the intermediate degassing storage tank 60 through, for example, one or more pipes 70. The intermediate degassing storage tank 60 acts as a buffer between the thermal processing unit 55 and the packaging machine 65 to compensate for the difference between the generally constant output flow rate of the thermal processing unit 55 and the generally variable beverage input requirements of the packaging machine 65. Although the capacity of the degassing storage tank 60 may be any size sufficient to compensate for the differences in the flow rates, it is preferable to choose the minimum tank capacity that will meet this requirement so as to minimize the dwell time that surplus product remains in the tank 60 prior to its use by the packaging machine.

Importantly, the degassing storage tank 60 degassifies the hot-fill product it receives from the thermal processing unit 55. Such degassification results in the removal of the excess gases generated as a result of the thermal processing.

The degassified, hot-fill liquid is then communicated from the degassing storage tank 60 to the packaging machine 65 through one or more pipes 75. Within the packaging machine 65, the hot fill liquid is placed into containers, such as glass bottles or jars, cans, PET or other polymer containers, etc. Since excess gases in the liquid have been substantially reduced by the degassing storage tank 60, the liquid may be dispensed into the containers by the packaging machine 65 at a rate that is significantly higher than its non-degassified counterpart.

During scaled down pilot plant testing of a prototype of the present system, single strength grapefruit juice was deaerated with an overall reduction of dissolved oxygen of about 8.84 mg/L. This compared to a reduction of about 7.53 mg/L in a standard tank design, and a reduction of about 9.54 mg/L that was achieved when the product was subjected to a −0.75 bar underpressure at 130° F. as is typical in flash deaeration. These tests thus indicated that the present system performed within 1% of the vacuum deaeration, and 14.4% above a control run using a standard tank.

A particular structure for one embodiment of the degassing storage tank will be discussed in connection with FIGS. 3–7. As illustrated in the partial cross-sectional views of FIGS. 3 and 4, the degassing storage tank 60 is of a generally cylindrical shape and includes a tank body 80 defining an interior chamber 85. The tank body 80 is supported, for example, by a support assembly 81 that includes a frame 82 and a plurality of adjustable legs 83.

The storage tank 60 further includes an inlet 90, an outlet 95, a vent 100, and a level sensor port 105. The inlet 90 and outlet 95 are disposed toward the bottom portion of the tank body 80 and, in the illustrated embodiment, are disposed approximately at right angles to one another. The vent 100 is disposed to vent gases from the headspace of the interior chamber 85 and, thus, is disposed at the upper portion of the tank body 80. The level sensor port 105 may be disposed at the height at which the liquid within the tank 60 is present.

A baffle wall 110 at least partially divides the interior chamber 85 and, for example, may include a first generally planar section 115 that extends from a sidewall of the tank body 80 and a second generally planar section 120. The sidewall from which the planar section 115 extends defines the smallest arc between the inlet 90 and outlet 95. The first planar section 115 extends from the sidewall and is angled toward the outlet 95. The second planar section 120 extends from the first planar section 115 at an angle that is generally perpendicular to the inlet 90. The end of the second planar section 120 that is distal the first planar section 115 defines a channel 125 through which the hot-fill liquid may pass.

A degasser, shown generally at 150, is connected to receive thermally processed, hot-fill liquid communicated to the inlet 90 from the thermal processing unit 55 and has an outlet end 155 that is open to the interior chamber. The degasser communicates the hot-fill liquid product through a series of sections having flow cross-sections that generally increase in size along the length of the degasser proceeding from the inlet 90 to the outlet end 155. This increase in flow area cross-section results in a lowering of the liquid velocity which, in turn, allows excess gas to escape from the liquid.

Figure 7:
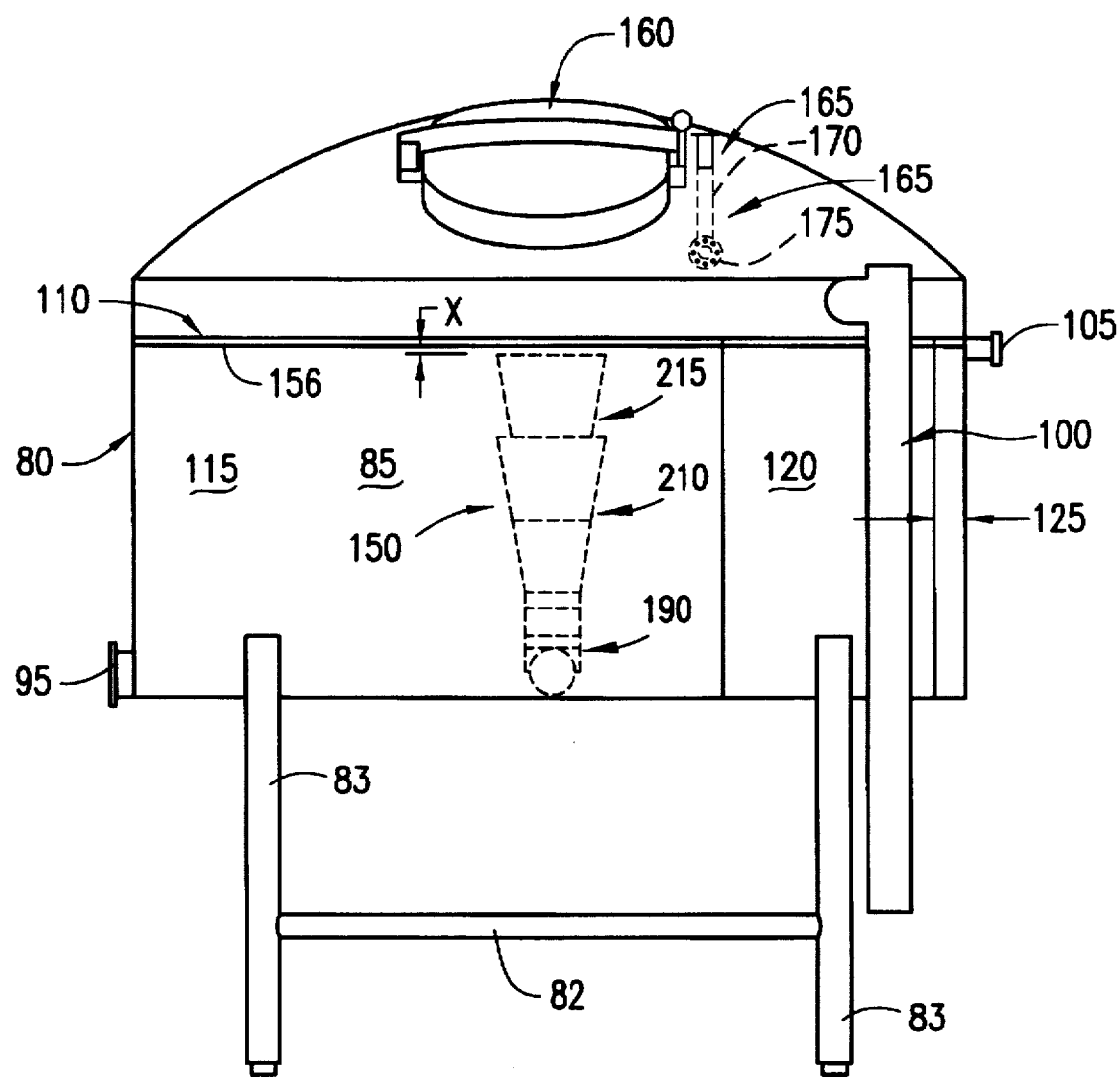
FIG. 7 is a partial cross-sectional side view of the intermediate degassing storage tank of FIG. 2.

The relative height of the baffle wall 110 and degasser 150 of the illustrated embodiment can best be seen in the partial cross-sectional view of FIG. 7. As illustrated, the baffle wall 110 extends above the liquid level, designated at 156 by a dotted line, while the upper portion of the degasser 150 remains below the liquid level 156. Preferably, the upper portion of the degasser is only slightly below the liquid level 156. For example, the distance X between the upper portion of the degasser and the liquid level 156 may be maintained at about one inch. The baffle wall 110, in combination with the relative orientation of the inlet 190, degasser 150, and outlet, thereby assists in preventing short circuiting of excess gases to the outlet 150.

Figure 6:
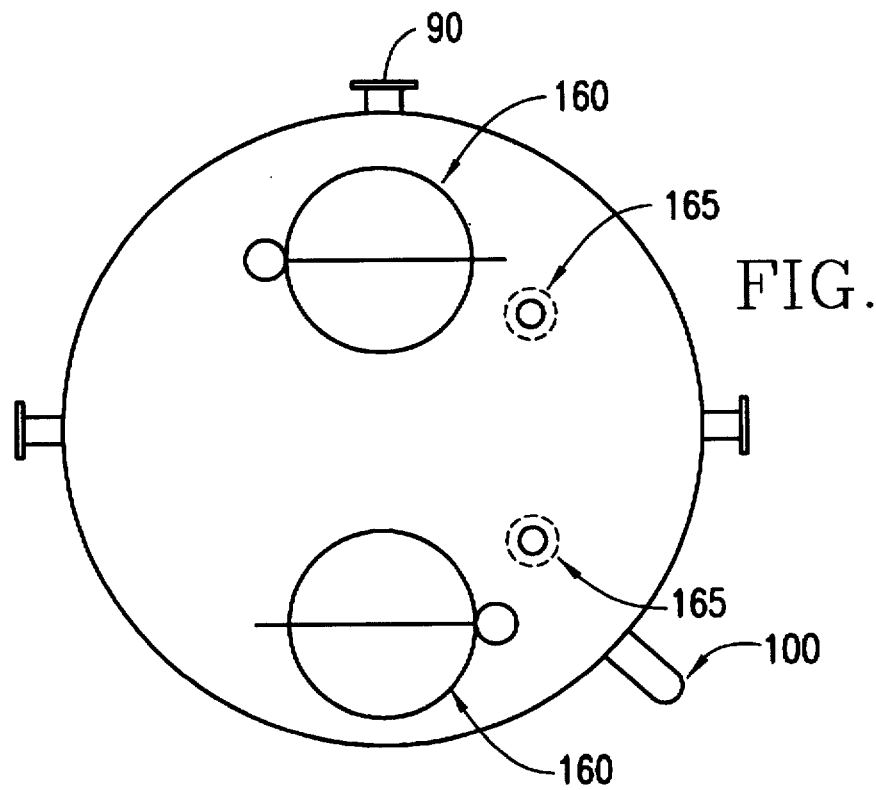
FIG. 6 is a top view of the intermediate degassing storage tank of FIG. 2.

Given that the thermal processing system 50 requires hygienic processing and filling conditions, several advantageous structures are included in the storage tank 60 to facilitate cleaning and service of the system. For example, as shown in FIG. 6, one or more re-sealable manhole units 160 may be provided in the top of the tank body 80. In the illustrated embodiment, two manhole units 160 are utilized and are positioned to allow access to opposite sides of the baffle wall 110. The manhole units allow access to the interior of the tank to allow manufacturing personnel to grind and polish the baffle wall 110 welds to a radius and finish that is acceptable for sanitary, food-grade applications. Additionally, one or more spray nozzle units 165 are used to provide communication of a cleaning and/or sterilizing fluid into the interior chamber 85. Two nozzle units 165 are shown and are disposed on opposite sides of the baffle wall 110. Each nozzle unit may include a pipe 170 communicating the cleaning/sterilizing fluid to a ball nozzle 175.

Figure 8:
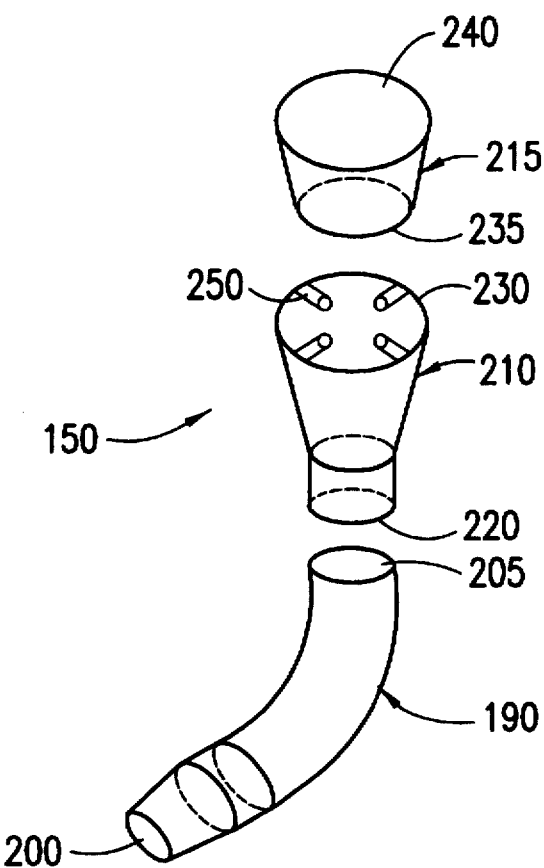
FIGS. 8 an 9 illustrate one embodiment of a degasser for use in the intermediate degassing storage tank of FIG. 2.
Figure 9:
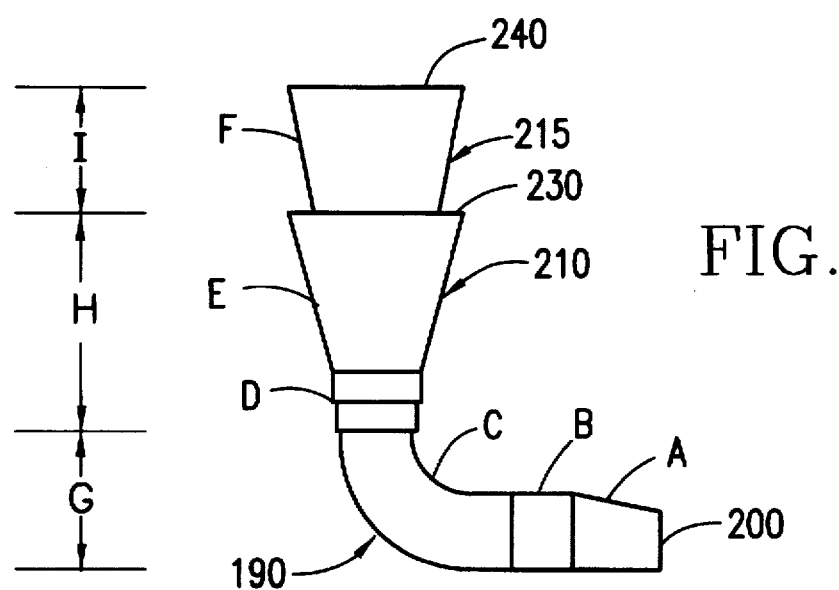

A specific construction of one embodiment of the degasser 150 is illustrated in FIGS. 8 and 9. The degasser 150 includes an elbow section 190 having a first open end 200 connected to receive the hot-fill liquid product from the inlet 90. The elbow section 190 also includes a second open end 205 disposed approximately at a right angle with respect to the first open end 200. In the illustrated embodiment, the first open end 200 has a smaller flow cross-section than the flow cross-section of the second opening 205. The elbow section 190 may be, for example comprised of more than a single piece of material.

The degasser 150 may also comprise first and second frustoconical channel sections 210 and 215. The first frustoconical channel section 210 has a first open end 220 connected to the second open end 205 of the elbow section 190 and a second open end 230 that is in fluid communication with the interior chamber 85. The second open end 230 of the first frustoconical channel section 210 has flow cross-section that is larger than the flow cross-section of the first open end 220.

The second frustoconical channel section 215 has a first open end 235 connected to receive the thermally processed hot-fill liquid product from the second open end 230 of the first frustoconical channel section 210 and a second open end 240 that opens to the interior chamber 85. The second open end 240 of the second frustoconical channel section has a flow cross-section that is larger than the flow cross-section of the first open end 235. The flow cross-section of the second end 230 of the first frustoconical channel section 210 is larger than the flow cross-section of the first open end 235 of the second frustoconical section. The opening of the first open end 235 of the second frustoconical channel section 235 is disposed to receive a portion of the thermally processed hot-fill liquid product from the opening of the second open end 230 of the first frustoconical channel section 210. Preferably, the flow cross-sections of the first and second frustoconical channel section are dimensioned so that a generally equal flow of hot-fill liquid flows from the second end 230 and the second end 240, although it will be recognized that different proportions may also be utilized. The second frustoconical section 215 is connected to the first frustoconical section, for example, by a plurality of radial weld tabs 250. To facilitate cleaning of the degasser 150, one or more of sections 190, 210, and 215 may be designed so that they may be detached from one another.

By way of example, and without limitation, the degasser may be divided into subparts A–F wherein the subparts correspond to the specifications set forth in TABLE I.

TABLE I

| Subpart | Specification |
| --- | --- |
| A | G&H G32 3 × 4" Reducer with Eccentric Ends; Buttweld; #7 Finish |
| B | 3" Diameter Pipe Spool Piece #7 Finish |
| C | G2S Elbow 90 degrees #7 Finish |
| D | 4.25" Pipe Spool Piece #7 Finish |
| E | 4.25 × 8" Concentric Reducer #7 Finish |
| F | 6 × 8" Concentric Reducer #7 Finish |

Also by way of example, the dimension of G may be about 7". The dimension of H may be about 11 inches, and the dimension of I may be 6". The overall height of the degasser 150 may thus be about two feet.

With reference again to the system diagram of FIG. 2, there is illustrated one exemplary manner of controlling the level of product in the degassing storage tank 60. As shown, a level detection circuit 300 is disposed to detect the level of product in the tank 60 and compares the level to a predetermined threshold, for example, 1"–2" above the baffle wall. The level controller circuit 300 provides a control signal along one or more lines 305 to a valve 310. When the level in the tank is above the predetermined threshold valve, the level detector circuit 300 controls the valve 310 so as to re-direct the product to the input of the thermal processing unit 55 through pipes 320, or the like, for re-processing. When the product level within the tank 60 is at its proper operational level, the product is passed from the output of the thermal processing unit 55 through line 70 to the input of the degassing storage tank 50.

Although the present invention has been described with reference to a specific embodiment, those of skill in the art will recognize that changes may be made thereto without departing from the scope and spirit of the invention as set forth in the appended claims.

I claim as my invention:

1. A thermal processing system for processing a hot-fill liquid product and filling containers with the hot-fill liquid product, the thermal processing system comprising:

a thermal processing unit for thermally processing a hot-fill liquid product;

a packaging machine for filling individual containers with the hot-fill liquid product; and an intermediate degassing tank comprising a tank body defining an interior chamber for holding the thermally processed hot-fill liquid;

an inlet receiving the thermally processed hot-fill liquid product from the thermal processing unit, an outlet facilitating fluid communication of the thermally processed hot-fill liquid product from the interior chamber of the degassing tank to the packaging machine, a vent, a degasser disposed in the interior chamber of the tank body and receiving the hot-fill liquid product from the inlet, the degasser having an inlet and an outlet and shaped to have a greater flow area at the outlet thereof than at the inlet thereof to thereby facilitate degassing of the hot-fill liquid product, the outlet of the degasser opening to the interior chamber of the tank body, gas removed from the liquid product passing to the vent, the degasser comprising an elbow section having a first open end connected to receive the hot-fill liquid product from the inlet of the intermediate degassing tank, and a second open end disposed approximately at a right angle with respect to the first open end, a frustoconical channel section having a first open end connected to the second open end of the elbow section and a second open end that is in fluid communication with the interior chamber of the tank body, the second open end of the frustoconical channel section having a flow cross-section that is larger than the flow cross-section of the first open end of the frustoconical channel section, and a further frustoconical channel section having a first open end connected to receive the thermally processed hot-fill liquid product from the second open end of the frustoconical channel section and a second open end in fluid communication with the interior chamber of the tank body, the second open end of the further frustoconical channel section having a flow cross-section that is larger than the flow cross-section of the first open end of the further frustoconical channel section, the flow cross-section of the second end of the frustoconical channel section being larger than the flow cross-section of the first open end of the further frustoconical section, a baffle disposed in the interior chamber to at least partially separate the outlet of the intermediate degassing tank from the inlet of the intermediate degassing tank.

2. A system as claimed in claim 1 wherein the baffle has a first side disposed toward the degasser and a second side disposed toward the outlet through the tank body, the intermediate degassing tank further comprising:

a first cleaning fluid nozzle disposed on the first side of the baffle; and a second cleaning fluid nozzle disposed on the second side of the baffle.

3. A system as claimed in claim 1 and wherein the intermediate degassing tank further comprises at least one resealable opening dimensioned to let a person pass into the interior chamber.

4. A system as claimed in claim 1 wherein the vent provides fluid communication between a headspace within the interior chamber and ambient atmosphere, the ambient atmosphere being about one atmosphere in pressure.

5. A system as claimed in claim 1 wherein the outlet of the intermediate degassing tank is disposed at approximately a right angle to the inlet of the intermediate degassing tank.

6. A system as claimed in claim 5 wherein the baffle comprises:

a first planar portion beginning at a sidewall of the tank body between the inlet and outlet of the intermediate degassing tank and extending across a first portion of the interior chamber at an angle toward the outlet of the intermediate degassing tank; and a second planar portion extending from the first planar portion at an angle generally perpendicular to the inlet of the intermediate degassing tank.

7. A system as claimed in claim 1 wherein the first open end of the further frustoconical channel section is disposed to receive a portion of the thermally processed hot-fill liquid product from the opening of the second open end of the frustoconical section.

8. A system as claimed in claim 7 wherein the further frustoconical section is connected to the frustoconical section by a plurality of radial tabs extending therebetween.

9. A system as claimed in claim 1 wherein the thermal processing unit includes means providing a flow of the hot-fill liquid product at a constant flow rate to the intermediate degassing tank.

10. A system as claimed in claim 9 wherein the packaging machine includes means for accepting the thermally processed hot-fill liquid product from the intermediate degassing tank at a variable rate.

11. A system as claimed in claim 7 wherein the frustoconical channel section is removable from the elbow section to thereby facilitate cleaning of the degasser.

12. A system as claimed in claim 8 wherein the frustoconical channel section and further frustoconical channel section are removable from the elbow section to thereby facilitate cleaning of the degasser.

13. A degassing tank for degassing a liquid product comprising:

a tank body defining an interior chamber holding the liquid product;

an inlet receiving the liquid product through the tank body into the interior chamber;

an outlet facilitating fluid communication of the liquid product from the interior chamber of the degassing tank through the tank body;

a vent;

a degasser disposed in the interior chamber of the tank body and receiving the liquid product from the inlet; the degasser having an inlet and an outlet and shaped to have a greater flow area at the outlet thereof than at the inlet thereof to thereby facilitate degassing of the liquid product, the outlet of the degasser opening to the interior chamber of the tank body, gas removed from the liquid product passing to the vent, the degasser comprising an elbow section having a first open end connected to receive the liquid product from the inlet of the degassing tank, and a second open end disposed approximately at a right angle with respect to the first open end, a frustoconical channel section having a first open end connected to the second open end of the elbow section and a second open end that is in fluid communication with the interior chamber of the tank body, the second open end of the frustoconical channel section having a flow cross-section that is larger than the flow cross-section of the first open end of the frustoconical channel section, and a further frustoconical channel section having a first open end connected to receive the liquid product from the second open end of the frustoconical channel section and a second open end in fluid communication with the interior chamber of the tank body, the second open end of the further frustoconical channel section having a flow cross-section that is larger than the flow cross-section of the first open end of the further frustoconical channel section, the flow cross-section of the second end of the frustoconical channel section being larger than the flow cross-section of the first open end of the further frustoconical section, a baffle disposed in the interior chamber to at least partially separate the outlet through the tank body from the inlet through the tank body.

14. A degassing tank as claimed in claim 13 wherein the baffle has a first side disposed toward the degasser and a second side disposed toward the outlet through the tank body, the intermediate degassing tank further comprising:

a first cleaning fluid nozzle disposed on the first side of the baffle; and a second cleaning fluid nozzle disposed on the second side of the baffle.

15. A degassing tank as claimed in claim 13 and wherein the tank body further comprises at least one resealable opening dimensioned to let a person pass into the interior chamber.

16. A degassing tank as claimed in claim 13 wherein the vent provides fluid communication between a headspace within the interior chamber and ambient atmosphere, the ambient atmosphere being about one atmosphere in pressure.

17. A degassing tank as claimed in claim 13 wherein the outlet through the tank body is disposed at approximately a right angle to the inlet through the tank body.

18. A degassing tank as claimed in claim 17 wherein the baffle comprises:

a first planar portion beginning at a sidewall of the tank body between the inlet and outlet through the tank body and extending across a first portion of the interior chamber at an angle toward the outlet through the tank body; and a second planar portion extending from the first planar portion at an angle generally perpendicular to the inlet through the tank body.

19. A degassing tank as claimed in claim 13 wherein the first open end of the further frustoconical channel section is disposed to receive a portion of the liquid product from the opening of the second open end of the frustoconical section.

20. A degassing tank as claimed in claim 19 wherein the further frustoconical section is connected to the frustoconical section by a plurality of radial tabs extending therebetween.

21. A degassing tank as claimed in claim 19 wherein the frustoconical channel section is removable from the elbow section to thereby facilitate cleaning of the degasser.

22. A degassing tank as claimed in claim 20 wherein the frustoconical channel section and further frustoconical channel section are removable from the elbow section to thereby facilitate cleaning of the degasser.

23. A degassing tank for degassing a liquid product comprising:

a tank body defining an interior chamber holding the liquid product;

an inlet receiving the liquid product through the tank body into the interior chamber;

an outlet facilitating fluid communication of the liquid product from the interior chamber of the degassing tank through the tank body;

a vent;

a degasser disposed in the interior chamber of the tank body and receiving the liquid product from the inlet, the degasser having an inlet and an outlet and shaped to have a greater flow area at the outlet thereof than at the inlet thereof to thereby facilitate degassing of the liquid product, the outlet of the degasser opening to the interior chamber of the tank body, gas removed from the liquid product passing to the vent, the degasser comprising an elbow section having a first open end connected to receive the liquid product from the inlet of the degassing tank, and a second open end disposed approximately at a right angle with respect to the first open end, a frustoconical channel section having a first open end connected to the second open end of the elbow section and a second open end that is in fluid communication with the interior chamber of the tank body, the second open end of the frustoconical channel section having a flow cross-section that is larger than the flow cross-section of the first open end of the frustoconical channel section, and a further frustoconical channel section having a first open end connected to receive the liquid product from the second open end of the frustoconical channel section and a second open end in fluid communication with the interior chamber of the tank body, the second open end of the further frustoconical channel section having a flow cross-section that is larger than the flow cross-section of the first open end of the further frustoconical channel section, the flow cross-section of the second end of the frustoconical channel section being larger than the flow cross-section of the first open end of the further frustoconical section.

24. A degassing tank as claimed in claim 23 wherein the vent provides fluid communication between a headspace within the interior chamber and ambient atmosphere, the ambient atmosphere being about one atmosphere in pressure.

25. A degassing tank as claimed in claim 23 wherein the outlet through the tank body is disposed at approximately a right angle to the inlet through the tank body.

26. A degassing tank as claimed in claim 23 wherein the first open end of the further frustoconical channel section is disposed to receive a portion of the liquid product from the opening of the second open end of the frustoconical section.

27. A degassing tank as claimed in claim 23 wherein the further frustoconical section is connected to the frustoconical section by a plurality of radial tabs extending therebetween.

28. A degassing tank as claimed in claim 23 wherein the frustoconical channel section is removable from the elbow section to thereby facilitate cleaning of the degasser.

29. A degassing tank as claimed in claim 23 wherein the frustoconical channel section and further frustoconical channel section are removable from the elbow section to thereby facilitate cleaning of the degasser.

* * * * *